United States Patent [19]

Bartzsch

[11] 4,032,469

[45] June 28, 1977

[54] PELLETED SULFUR COMPOSITIONS

[75] Inventor: Henning Bartzsch, Hannover, Germany

[73] Assignee: Kali-Chemie Aktiengesellschaft, Hannover, Germany

[22] Filed: May 25, 1976

[21] Appl. No.: 689,858

Related U.S. Application Data

[62] Division of Ser. No. 401,502, Sept. 27, 1973, Pat. No. 3,979,316.

[30]  Foreign Application Priority Data

Sept. 27, 1972  Germany .......................... 2247371

[52] U.S. Cl. ............................ 252/182; 252/363.5; 23/313 R; 260/23.7 M; 260/33.6 AQ; 264/117
[51] Int. Cl.² ...................... C08K 3/30; C09K 3/00
[58] Field of Search ....... 252/182, 189, 309, 363.5; 23/313 R; 264/117; 260/23.7 M, 33.6 AQ

[56]  References Cited

UNITED STATES PATENTS

| | | | |
|---|---|---|---|
| 3,012,985 | 12/1961 | Zakheim et al. | 260/33.6 |
| 3,636,188 | 1/1972 | Driscoll | 264/117 |
| 3,691,071 | 9/1972 | Corrin | 252/8.55 D |
| 3,706,708 | 12/1972 | Kearnan | 252/363.5 |

*Primary Examiner*—Benjamin R. Padgett
*Assistant Examiner*—Irwin Gluck
*Attorney, Agent, or Firm*—Michael J. Striker

[57]  ABSTRACT

Pelleted sulfur compositions consisting essentially of particles of sulfur which include a substantial proportion of carbon-disulfide-insoluble sulfur particles together with a binder consisting essentially of a plasticizing or softening oil containing an anionic or nonionic surfactant in an amount equivalent to between 0.5 and 10% of the weight of the pelleted composition, the pelleted composition containing an amount of the plasticizing oil equivalent to between 10 and 60% of its weight. The pelleted composition is free-flowing, storable, and disperses homogeneously when distributed in rubber mixtures by milling on heated compounding rolls.

7 Claims, 4 Drawing Figures

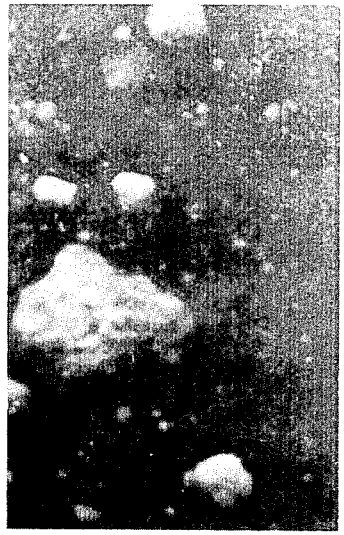
FIG. 1  ⊢──┤ 0.1 mm
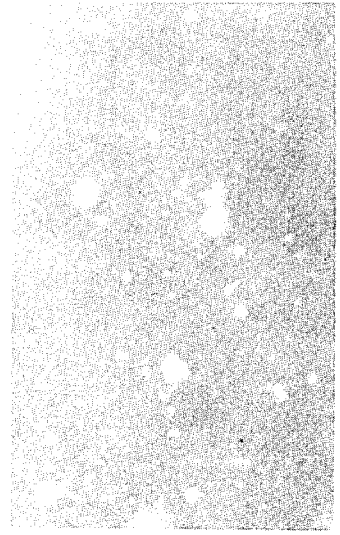
FIG. 2  ⊢──┤ 0.1 mm
FIG. 3  ⊢──┤ 0.1 mm
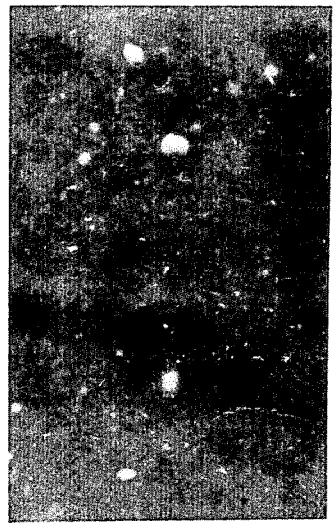
FIG. 4  ⊢──┤ 0.1 mm

PELLETED SULFUR COMPOSITIONS

This is a division of application Ser. No. 401,502, filed Sept. 27, 1973, now U.S. Pat. No. 3,979,316.

BACKGROUND OF THE INVENTION

The present invention pertains to a process for the production of pellets containing insoluble sulfur and the pellets thus produced.

Insoluble sulfur compositions, which include substantial proportions of polymeric sulfur which is an amorphous form of sulfur that is insoluble in carbon disulfide are vulcanizing agents for rubber and in many cases are used for this purpose in preference to elemental sulfur, which are also known as rubbermaker's sulfur, that is, alpha-rhombic and beta-monoclinic crystals of sulfur, both of which are completely soluble in carbon disulfide. The solubility of elemental sulfur in rubber increases with increasing temperature. Sulfur crystallizes out on the surface as well as throughout a mixture of elemental sulfur and rubber that is mixed at elevated temperatures and cooled so that, because of this nonhomogeneous distribution of the sulfur, the rubber is likely to be overvulcanized or undervulcanized by the following vulcanization. Such crystallization of elemental sulfur is called "bloom".

The use of insoluble sulfur eliminates blooming and other difficulties, provided that it is distributed homogeneously throughout the rubber. To achieve this result the insoluble sulfur must be added in the form of very small particles. Such fine powders, however, can be handled only with difficulty. Not only does the incidental formation of dust result in loss of material, but it is also often a great nuisance to workmen. Furthermore, elimination of dust from a plant requires costly equipment. The poor flowability of insoluble sulfur impedes its transportation, storage, dispensing from storage bins, as well as its metering. Furthermore, particles of insoluble sulfur have the property of becoming strongly charged electrostatically by rubbing against each other, and thereby increase the possibility of the occurrence of an explosion. The homogeneous distribution and thermal stability of commercial insoluble sulfur compositions in rubber mixtures increases with increasing purity as well as crystallinity of the compositions. Insoluble sulfur compositions which contain more than 30% by weight of sulfur that is insoluble in carbon disulfide can generally be used in vulcanizing rubber. Because of the continually increasing use of fast-running high-efficiency mixers, in which sudden rises in temperatures up to 150° C can occur, sulfur compositions containing between 60 and 100% by weight of insoluble sulfur are used, and the requirements with respect to their thermal stability are continually increasing. By the term "insoluble sulfur composition" as used herein are to be understood sulfur compositions which contain at least 30% by weight of sulfur that is insoluble in carbon disulfide.

Prior proposals for improving the characteristics or properties of insoluble sulfur compositions provided only solutions to one or more but not all of the problems that are referred to hereinbefore. For example, so-called process oils, that is, certain naphthenic or paraffin oils in amounts from 10 to 40% by weight have for a long period been added to insoluble sulfur compositions but produced essentially only a decrease in the amount of dust.

In U.S. Pat. No. 3,706,708 is described a process of admixing alkylphenoxy poly(ethyleneoxy)ethanols with insoluble sulfur used for vulcanizing to improve the dispersibility of the insoluble sulfur in rubber. By supplementary addition of a suitable quantity of oil, powdered products could also be produced. Powdered products of this process had poor flowability characteristics and some of them tended to become charged electrostatically to a greater degree than untreated insoluble sulfur.

Attempts have also been made to convert insoluble sulfur to a more compact form by addition of binders. The production of such molded or shaped bodies is complicated, however, by the concomitant requirement that the molded body completely disintegrate into its component particles when it is mixed with rubber or other plastic substances under pressure and dispersed homogeneously therein. Moreover, the added binders must not impair the stability of the insoluble sulfur and the characteristics of the rubber mixture.

A method is described in the U.S. Pat. No. 3,431,214 for making nondusting, free-flowing, stable sulfur pellets by compacting a mixture of sulfur with from about 2 to about 40% by weight of petrolatum, which is also known as petroleum jelly. Although the pellets thus produced are free-flowing and not dusty, a molding apparatus is required for their production and the pelleting operation also represents a loss of time. Besides that, petrolatum in amounts of up to 40% of the weight of the insoluble sulfur, is not a conventional additive to rubber mixtures and consequently a longer period of mixing is required to produce the desired rubber product.

A process for producing a pelleted sulfur is described in U.S. Pat. No. 3,012,985, in which a pressed pellet is made by extruding a paste formed from 100 parts of insoluble sulfur with between 0.1 and 1.25 parts of rubber latex, between 0.025 and 0.25% of a surfactant, between 0.25 and 1.5 parts of an oil or plasticizer, and sufficient water to form an extrusile paste. The extruded pellets are then dried at a temperature between 50 and 90° C. However the product is not usable because the pellets after drying disintegrate into powder. During the production of the pellets the insoluble sulfur is converted to soluble sulfur, which is undesirable and cannot be prevented because of the alkaline stabilizers which are normally added to latexes to prevent their premature coagulation.

SUMMARY OF THE INVENTION

The object of the present invention is to provide a process for producing a pelleted insoluble sulfur composition which is storable, free-flowing and homogeneously dispersible in rubber mixtures by the use of binders which are normally added to rubber mixtures and which pelleting process can be performed without requiring a molding apparatus.

This object is achieved in accordance with the process of the present invention by using a binder consisting of a plasticizer or softener whose surface tension has been reduced in an amount between 10 and 60% by weight of the total composition. The reduced surface tension is obtained by addition of an anionic or nonionic surfactant to the plasticizer which is preferably a naphthenic or paraffinic petroleum oil.

DESCRIPTION OF THE DRAWING

The drawing includes four photomicrograms showing the distribution of sulfur particles in vulcanized rubber mixtures the particles of which were introduced on heated compounding rolls in the form of pelleted and powdered insoluble sulfur compositions containing a plasticizing oil, the plasticizing oil containing a surfactant in the case of the pelleted compositions and no surfactant in the case of the powdered compositions. The photomicrograms are described in greater detail hereinafter in connection with the examples.

DETAILED DESCRIPTION

It was discovered quite unexpectedly that insoluble sulfur and plasticizers that are referred to as process oils that had previously been used to produce pellets, for example as described in U.S. Pat. No. 3,012,985, could be used to produce pellets in a conventional high-intensity mixer by a simple operation when the wettability of the oil was increased and the oil was used in a specific range of proportions and certain other conditions were observed.

The process of the present invention for the production of pellets containing insoluble sulfur that are storable, free-flowing, as well as being improved with respect to their dispersibility in rubber mixtures comprises intimately mixing together in a high-intensity mixer insoluble sulfur with a binder consisting of a plasticizing oil whose surface tension had been reduced by addition thereto of between 0.5 and 10% by weight, based on the weight of the final pelleted composition, of an organic wetting agent of the group consisting of anionic and nonionic surfactants, the amount of the binder being sufficient to produce pelleting of the composition and the mixing operation being continued for such period that the formation of the pellets is completed. Preferably the amount of wetting agent or surfactant that is added to the plasticizing oil is equivalent to between 0.5 and 5% by weight of the pelleted composition.

Plasticizing oils which are particularly suitable for this purpose are pine tar oil, cottonseed oil, synthetic plasticizers such as butyl oleate and dioctyl phthalate, particularly process oils such as highly refined petroleum oils manufactured expressly for plasticizing various rubbers, such as specified in U.S. Pat. No. 3,012,985, and plasticizers and softeners that are listed on pages 233 to 362 of the 1965 Edition or pages 149 to 226 of the 1968 Edition of Materials and Compounding Ingredients for Rubber and Plastics compiled by the Editors or Rubber World, New York, N.Y., and published by Publishers Printing Company, Louisville, Ky., such as Process Oil C-255-NS and Process Oil C-293-NS that are available from C.P. Hall Co.

A particularly suitable plasticizing oil is the naphthene-base petroleum plasticizing oil that was used in the examples hereinafter, which was a naphthenic petroleum oil having a refractive index ($n_D^{20}$) of 1.504, a specific gravity ($n_4^{20}$) of 0.903, a viscosity of 59.0 centistokes at 20° C, a flash point (Marcussoner method) of 185° C, a pour point of −35° C, and an average molecular weight of 290, which was obtained from Firma Rudolf Fuchs Mineraloelwerk in Mannheim, Germany, under the designation Ingraplast.

The surface tension of the plasticizing oils that are to be used for the production of pellets in accordance with the process of the present invention must be so reduced that the particles of insoluble sulfur are wetted adequately. Generally any surfactant can be used for this purpose but preferably neutral synthetic wetting and dispersing agents are used, especially anionic and nonionic compounds, which, unlike most cationic wetting agents, do not have any substantial effect on the thermal stability or the reversion of the insoluble sulfur to soluble form. Suitable compounds are, for example, the anionic surfactants which include in their molecular structure at least one sulffate or sufonate radical, at least one alkyl or aryl radical with at least 8 to 22 carbon atoms and, if necessary, at least one double bond and at least one oxygen or nitrogen atom, such as alkylarylsulfonates, olefin sulfonates, alkyl sulfates, sulfates of oxo and other branch-chain alcohols or alkylsulfamidocarboxylic acids. In addition to these, salts of carboxylic acids with straight or branched chains or ring-containing saturated or unsaturated acids such as fatty acids, naphthenic acids, salts of aminocarboxylic acids or esters of carboxylicic acids can be used. Good results can also be obtained with mixtures of various of these surfactants.

Nonionic surfactants that are suitable for this purpose include substituted polyhydric alcohols and polyglycol ethers such as alkylpolyglycol ethers, acylpolyglycol ethers and alkylarylpolyglycol ethers. The surfactants may advantageously be added to the oil in the form of a solution in an alcohol such as propanol, isopropanol, butanol or isobutanol.

The plasticizing oil containing surfactant is an effective binder in forming pellets from insoluble particles off all sizes in high-intensity mixing apparatus. The formation of pellets by intensive mixing in accordance with the process of the present invention is believed to be attributable not only to wetting but also to the actual combination of at least a portion of the surfactant-containing plasticizing oil with the insoluble sulfur particles. The amount of surfactant-containing plasticizing oil that is required increases with decreasing size of the particles of insoluble sulfur, that is, it increases with increasing surface area of the particles. The amount of the surfactant-containing plasticizing oil that is required in percentage by weight for pelleting a particular insoluble sulfur can be estimated by determining the oil-absorption number of the particular insoluble sulfur. This oil-absorption number of the insoluble sulfur is the maximum amount of oil in milliliters that is completely absorbed by 100 grams of the insoluble sulfur in changing to a firm pasty mass from its powdered form. The amount of the surfactant-containing plasticizing oil that is required to be added to the insoluble sulfur in percentage by weight to produce a satisfactory pellet in accordance with the process of the present invention is slightly less than one-half the oil-absorption number thus determined. The amount of oil that is required for any particular insoluble sulfur lies within a small range of a few percent by weight. If less of the surfactant-containing oil is used than is required based upon the oil-absorption number of the insoluble sulfur, only a dust-free powder is obtained, albeit a powder with good dispersibility characteristics in rubber. Addition of too much oil produces a soft unctous mass.

Instead of adding an amount of surfactant-containing oil to the insoluble sulfur in a high-intensity mixing apparatus to produce the pelleted composition with an amount of oil determined in accordance with the oil-absorption number as disclosed hereinbefore, a greater amount of the oil can alternatively be added, followed by the addition to the pellets thus produced of further increments of powdered insoluble sulfur until a pellet of the desired hardness and dryness is produced.

The oil content of the pellets obtained by either of the two foregoing procedures can without difficulty be brought to a lower oil content by adding the mixing operation suitable amounts of insoluble sulfur. In this manner, dependent upon the oil-absorption number of the insoluble sulfur that is used in the process, a pellet can be obtained whose oil content is suitable for any intended use.

For the pelleting operation, conventional high-intensity mixing apparatus is used. Especially suitable high-intensity mixers are a so-called lodige scraper-blade mixer or kneader which operates on a centrifugal mixing principle and a so-called Nauta Blitzmischer of the Netherlands Company, Nautamix, N.V., which is represented in the United States by The J. H. Day Company of Cincinnati, Ohio, in which, by means of a rotating worm or helix, which travels along the internal surface of a conical receptacle, a three-dimensional mixing motion is imparted to the substances that are mixed therein. Drum mixers, and ribbon mixers, which latter are also referred to as double-helical mixers, are not suitable for this purpose.

The particle-size distribution of the pellets can be controlled within a certain range by variations in the operating conditions of the high-intensity mixers, as well as by putting into the circuit an auxiliary mixing unit. The commerical sulfur composition containing at least 90% by weight of insoluble sulfur that is known under the tradename Crystex, that is produced by Stauffer Chemical Company, for example, which has an oil-absorption number of about 75, can be pelleted directly by adding a sufficient amount of a surfactant-containing plasticizing oil to produce a composition containing between about 30 and 33% by weight of the oil and subjecting the mixture to intimate mixing in a high-intensity mixer. It is also possible to agglomerate the Crystex powder with an amount of oil sufficient to produce an agglomerate containing 40% by weight, for example, and thereafter, by addition of further increments of the insoluble sulfur powder, to produce the same pellet. The oil content of the final pelleted composition can likewise be reduced to 20% by weight, for example, by further additions of insoluble sulfur without loss of the favorable characteristics of the pellets. The bulk density of such pellets ranges from between approximately 0.75 and 0.85 kilogram per liter.

The amount of plasticizing oil that is required for different samples of sulfur powders to produce a suitable pellet can be determined by preliminarily determining the oil-absorption number of the sulfur sample as described hereinbefore. Since the oil-absorption numbers of different kinds of sulfur compositions containing insoluble sulfur may vary within a wide range, an amount of surfactant-containing plasticizer oil that is equivalent to between 10 and 60% by weight of the pelleted composition may be incorporated to produce a satisfactory pellet.

The advantages of the process of the present invention as described hereinbefore are obvious. By the use of conventional mixing apparatus, pellets can be succesfully produced which reduce the danger of dust explosions that are associated with the handling of sulfur compositions containing insoluble sulfur. The pellets are so stable that they can be shipped in containers, stored in bins, and automatically metered, without being subjected to any further treatment. The content of plasticizing oil can be adapted to the desired requirements. In comparison with merely oil-treated insoluble sulfur, the metering of the pelleted compositions of the present invention into rubber mixtures is greatly facilitated. The particles of the insoluble sulfur in the pellets are distributed homogeneously in optimal sizes without clumps throughout the vulcanized rubber mixture as shown in the accompanying photomicrograms. The invention is further described and illustrated in the following examples.

EXAMPLE 1

Into a 50-liter scraper-blade kneader mixer such as a so-called Lodige kneader of this type was added 15 kilograms of a commercial grade of insoluble sulfur that is available under the trade name Crystex from Stauffer Chemical Company. This product consists essentially of elemental sulfur of which 90% by weight is insoluble in carbon disulfide. The particle size distribution range of this commercial sulfur product is as follows:

0.177 millimeter: 99.99% passed
0.149 millimeter (sieve No. 100): 99.98% passed
0.074 millimeter (sieve No. 200): 98.78% passed
0.044 millimeter (sieve No. 325): 95.67% passed The oil-absorption number of this sulfur composition is 75. After the mixer containing the sulfur had been operating, in 10 seconds 7.5 kilograms of the naphthene-base petroleum plasticizing oil that was described hereinbefore to which had been added 1.5% (based on the weight of the pelleted composition) of a liquid anionic surface-active emulsifier obtained from Farbwerke Hoechst AG under the trade name Emulsogen L was added thereto. Pellets of sulfur started to form after 1 minute of operation of the mixer and the mass was completely formed into pellets after 4 minutes, that is, the moment when all the so-called fine or dust particles of the powdered insoluble sulfur were converted into pellets having a diameter between about 1 and 3 millimeters. The bulk or apparent density of the pelleted composition was 0.82 kilogram per liter.

EXAMPLE 2

The procedure described in Example 1 was repeated with the same powdered sulfur-containing insoluble sulfur and plasticizing oil in the same proportions, but the plasticizing oil contained 1.5% based on the weight of the pelleted composition of the various surfactants that are specified in the following table. The plasticizing oil was added within 10 seconds of the start of the mixing operation and the mixing was continued for 5 more minutes after each powdered mixture had been completely pelleted. In all cases the pellets had a diameter of between 0.5 and 4 millimeters and the bulk density specified in the table. The surfactants that were used together with their trade names were the following:

| Surfactant | Bulk density, kilograms per liter |
| --- | --- |
| 95% sodium diisopropylnaphthalene sulfonate, 5% isobutanol (Nekal A from BASF) | 0.79 |
| Lauryl-myristyl sulfate (Cyclanon LP from BASF) | 0.80 |
| Modified sodium oleyl ether sulfate (Genapol SN from Farbwerke Hoechst AG) | 0.78 |
| Oleic acid methyl tauride | |

-continued

| Surfactant | Bulk density, kilograms per liter |
|---|---|
| (Hostapon T from Farbwerke Hoechst AG) | 0.82 |

EXAMPLE 3

In a 2000-liter high-intensity mixer provided with a worm impeller that was referred to hereinbefore as the "Nauta Blitzmischer" 600 kilograms of the same sulfur powder that had the same particle size distribution and oil-absorption number as that used in Example 1 was placed in the mixer and mixed therein for 20 minutes at a worm speed of 90/3 revolutions per minute, after which period 300 kilograms of a naphthene-based plasticizing oil containing 1.5% (based on the weight of the pelleted composition) of the surfactant that was used in Example 1 was added. Pellets began to form within about 15 minutes after the beginning of the addition of the plasticizing oil and the mixing was discontinued 5 minutes after the pelleting of all the powdered sulfur had been completed. The pellets thus obtained had a particle size between 1 and 3 millimeters and had a bulk density of 0.79 kilogram per liter.

EXAMPLE 4

The procedure described in Example 2 was repeated with 600 kilograms of the same powdered sulfur and 300 kilograms of a naphthene-based plasticizing oil which contained 2.5% (based on the weight of the pelleted composition) of the surfactant that was used in Example 1. After the completion of the pelleting of the mixture subsequently by further mixing an additional 600 kilograms of the same powdered sulfur was gradually added in small increments within 10 minutes. As a result the oil content of the pellets was thus reduced from 33% to 20%. At the end of the addition of the additional amount of powdered insoluble sulfur, the powder was completely incorporated into the pellets. The main portion of the pellets thus obtained had a size of between 1 to 3 millimeters and their bulk density was 0.78 kilogram per liter.

To determine the storability of the products of Examples 3 and 4, 25-kilogram samples of each were packed into paper sacks. Eight layers, each including three of these filled sacks, were then piled onto pallets having a size of 80 × 120 centimeters. Onto two of these pallets were then piled two additional pallets each loaded with 600 kilograms of filled sacks. After three months of storage at prevailing summer temperatures, the pellets in all of the six layers of sacks were found to be freeflowing and had not crumbled into powder. The content of insoluble sulfur in the product had not changed during this storage period.

EXAMPLE 5

The pellets produced in Examples 3 and 4 containing 33% and 20% by weight, respectively, of plasticizing oil whose surface tension had been reduced by the addition of the surfactant were mixed with synthetic rubber to determine their dispersibility therein. For comparison, equivalent mixtures of synthetic rubber and the same sulfur in powdered form containing 33% and 20% by weight of plasticizing oil without surfactant were also prepared. The tests were performed in the following manner:

The synthetic rubber that was used was a 1,4-cis-polyisoprene that had a viscosity of ML-4 at a temperature of 100° C and a Mooney scorch value of 82, that was obtained from Firma Goodyear GmbH under the trade name Natsyn 2200.

A pair of heated compounding rolls for laboratory use which had an axial length of 225 millimeter and a diameter of 100 millimeters that were obtained from Firma Berstorff of Hannover, Germany, and are further identified as type RR were used for mixing in this Example. The rolls were heated by means of heated circulating oil and were maintained at a temperature of 88° C. A nip of 1 millimeter was maintained between the heated rolls.

A strong sheet having a thickness of 1 millimeter consisting of 125 parts by weight of the synthetic rubber was formed on these rolls and subsequently one of the samples of the pelleted sulfur was gradually added to the sheet during the course of 10 seconds in an amount corresponding to 2.5 parts by weight of pelleted sulfur, that is, an amount equivalent to 2.0% by weight of the rubber. The mixing was continued on the compounding rolls at a temperature of 88° C and was completed within 5 minutes, while the sheet was passed ten times through the rolls. The sheet was then removed, suspended in air, and allowed to cool to room temperature. A piece having a size of 17 square centimeters was cut from the center of the sheet and placed without deformation on a support and photographed under inclined top lighting at a magnification of 100 diameters. (Addition of the powdered sulfur in the same manner.)

The microphotograms of these sheets which are represented in the drawing accompanying this application, show only portions of the said rubber sheets with specks of insoluble sulfur. Under each photomicrogram is indicated by means of a line representing 0.1 millimeter the scale of the photomicrogram. The sheets were as follows:

FIG. 1: Powdered insoluble sulfur with 20% by weight of plasticizing oil without any surfactant. The largest speck in the photomicrogram is only one of six specks of approximately that size within the 17-square-centimeter area of the cutout piece of the sheet.

FIG. 2: Pelleted insoluble sulfur containing 20% by weight of plasticizing oil containing surfactant. Typical sample which shows no large specks.

FIG. 3: Powdered insoluble sulfur with 33% by weight of plasticizing oil without any surfactant. The largest speck is only one of ten specks of approximately that size within the 17-square centimeter area of the cutout piece of the sheet.

FIG. 4: Pelleted insoluble sulfur containing 33% by weight of plasticizing oil containing surfactant. Typical sample showing no large specks.

COMPARATIVE EXAMPLE

As described in the Example of U.S. Pat. No. 3,012,985, 100 grams of insoluble sulfur, 75 milliliters of water, 0.1 gram of emulsifier (Atlas 1256), 1.0 gram of oil (Caprol oil B) and 2.5 grams of a butadiene-styrene latex containing about 1 gram of butadiene-styrene rubber were mixed together into a paste. This paste was forced through the openings of a No. 8 sieve (8 meshes per inch) and the extruded strands were cut from the sieve and allowed to drop into a pan which was then oscillated for 30 seconds in a circulatory motion while pellets having a size of approximately 3 millimeters were formed from the cut strands of paste. These pellets were subsequently dried for 2 hours at a temperature of 90° C.

After cooling, the dried pellets were shaken in a No. 40 sieve (40 mesh per inch). An amount corresponding to 44% by weight of the pellets passed through the openings of the sieve, about two-thirds of which were in powder form.

Into a 100-milliliter jar were placed 17.66 grams of the cooled dry pellets and the jar was closed and tumbled end-over-end for 15 minutes at a rate of 96 revolutions per minute and the pellets were then again shaken in a No. 40 sieve. The residue in the sieve amounted to 42.2% of the original quantity and the particles that passed through the sieve consisted predominantly of dusty fine particles. The pellets dissolved completely in carbon disulfide indicating that all the insoluble sulfur had been converted in the pelleting operation into soluble sulfur.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A pelleted sulfur composition consisting essentially of particles of sulfur which include a substantial proportion of carbon-disulfide-insoluble sulfur particles together with a binder consisting essentially of a rubber plasticizing oil containing an amount equivalent to between 0.5 and 10% of the weight of the pelleted composition of an anionic or nonionic surfactant, the amount of the plasticizing oil being equivalent to between 10 and 60% by weight of the pelleted composition.

2. A pelleted sulfur composition as defined in claim 1 in which the surfactant is an anionic surfactant of the group consisting of alkylarylsulfonates and fatty acid sulfonates and their water-soluble salts.

3. A pelleted sulfur composition as defined in claim 1 in which the amount of the binder in percent by weight of the composition is slightly less than one-half the oil-absorption number of the sulfur particles in the composition, the said oil-absorption number being the amount of the oil binder in milliliters that is absorbed by 100 grams of the sulfur particles.

4. A pelleted sulfur composition as defined in claim 1 in which at least 30% by weight of the sulfur particles are carbon-disulfide-insoluble sulfur particles.

5. A pelleted sulfur composition as defined in claim 1 in which at least 90% by weight of the sulfur particles are carbon-disulfide-insoluble sulfur particles.

6. A pelleted sulfur composition as defined in claim 1 in which the plasticizing oil is a process oil that is adapted for plasticizing rubber.

7. A pelleted sulfur composition as defined in claim 1 in which the plasticizing oil is a naphthene-base petroleum oil.

* * * * *